United States Patent [19]

Pham

[11] Patent Number: 5,508,359
[45] Date of Patent: Apr. 16, 1996

[54] BLENDS OF HIGH MW BRANCHED POLYCARBONATE WITH A LOWER MW POLYCARBONATE

[75] Inventor: Hoang T. Pham, Lake Jackson, Tex.

[73] Assignee: The Dow Chemical Company, Midland, Mich.

[21] Appl. No.: 156,154

[22] Filed: Nov. 22, 1993

[51] Int. Cl.$^6$ ........................................................ C08L 69/00
[52] U.S. Cl. ........................ 525/462; 525/469; 264/328.1; 264/328.17
[58] Field of Search .................................. 525/462, 466, 525/468, 469; 264/328.1, 328.17

[56] References Cited

U.S. PATENT DOCUMENTS

| | | | |
|---|---|---|---|
| 3,166,606 | 1/1965 | Reinking et al. | |
| 3,652,715 | 3/1972 | Holub et al. | 525/146 |
| 3,770,697 | 11/1973 | Holub et al. | 528/203 |
| 3,931,108 | 1/1976 | Binsack et al. | 528/199 |
| 4,001,184 | 1/1977 | Scott . | |
| 4,230,548 | 10/1980 | Adelmann et al. | 528/196 |
| 4,415,724 | 11/1983 | Mark et al. | 528/204 |
| 4,415,725 | 11/1983 | Hedges et al. | 528/204 |
| 4,436,879 | 3/1984 | Miller et al. | 525/439 |
| 4,469,852 | 9/1984 | Tyrell et al. | 525/468 |
| 4,562,242 | 12/1985 | Mark et al. | 528/193 |
| 4,652,602 | 3/1987 | Liu | 524/449 |
| 4,912,194 | 3/1990 | Rosenquist | 528/196 |
| 4,999,408 | 3/1991 | Rosenquist | 525/463 |
| 5,141,824 | 12/1992 | Marks et al. | 528/198 |
| 5,198,527 | 3/1993 | Marks et al. | 528/198 |
| 5,286,813 | 2/1994 | Morioka | 525/468 |

FOREIGN PATENT DOCUMENTS

| | | |
|---|---|---|
| 0390064 | 10/1990 | European Pat. Off. . |
| 0498406 | 2/1995 | European Pat. Off. . |
| 58-138754 | 8/1983 | Japan . |
| 60-215051 | 10/1985 | Japan . |
| 61-016962 | 1/1986 | Japan . |
| 63-015821 | 1/1988 | Japan . |
| 63-003023 | 1/1988 | Japan . |
| 3-243655 | 10/1991 | Japan . |
| 3-281567 | 12/1991 | Japan . |

OTHER PUBLICATIONS

A Rheological Study of Branching in Polycarbonate by Blending, Hansen, M. G. and Jansma, J. B., ACS, vol. 20, 2, 1979, pp. 157–159.

Primary Examiner—David Buttner

[57] ABSTRACT

Improved injection molded thin-wall corner parts are prepared using carbonate polymer blend compositions where an amount of a higher molecular weight branched carbonate polymer component (HMWB PC) is combined with a different second, lower molecular weight carbonate polymer component. A HMWB PC component is selected which is homogeneously dispersible in a blend with the second component. The carbonate polymer blends suitable for use according to the present invention have surprisingly improved combinations of physical properties and processability and provide improved injection molded parts.

16 Claims, 1 Drawing Sheet

BLENDS OF HIGH MW BRANCHED POLYCARBONATE WITH A LOWER MW POLYCARBONATE

FIELD OF THE INVENTION

This invention relates to easy flow carbonate polymer blend compositions comprising an amount of a higher molecular weight, branched carbonate polymer component and an amount of a different lower molecular weight carbonate polymer as a base resin second component. The invention also involves an improved process for preparing injection molded, thin-walled corner parts from easy flow carbonate polymer resins. The process is based on the use of easy flow carbonate polymer blend compositions comprising an amount of a higher molecular weight, branched carbonate polymer component ("HMWB PC") and an amount of a lower molecular weight carbonate polymer as a base resin. These resin blend compositions provide improved processes for preparing injection molded, thin-walled corner parts due to their excellent combinations of processability and physical properties of the molded parts. Improved injection molded, thin-walled corner parts are also obtained having a good balance of physical properties including particularly improved resistance to stress cracking.

BACKGROUND OF THE INVENTION

In attempts to prepare injection molded, thin-walled parts from carbonate polymer resins, it has been observed that such articles prepared from carbonate polymer resins are affected by the molecular weight (Mw). It is known that the processability of carbonate polymer resins decreases as the molecular weight of the carbonate polymer resins increases, the higher molecular weight resins being more difficult to process due to their higher viscosity and corresponding lower melt flow rate.

For example, in Japanese Patent Publication 03-243,655 (1992) amounts of a lower molecular weight carbonate polymer are incorporated into a high molecular carbonate polymer composition in attempting to improve the flow and processability properties of such carbonate polymers. However, it is known that higher and lower molecular weight components are often difficult to homogeneously blend due to their differences in melt viscosities and do not produce the best possible combinations of polymer processability and molded part physical properties.

In Japanese Patent Publication 60-215,051 (1985) it is shown that branched resins can be incorporated in varying amounts into blends with a higher melt flow rate, low molecular weight linear carbonate polymer to improve the melt strength of the low molecular weight resin. In U.S. Pat. No. 3,931,108 certain branched resins are shown to be extrudable into film with improved stress crack resistance. In U.S. Pat. No. 4,912,194 it is proposed that crosslinked or branched polycarbonates can be prepared by incorporating a diester diphenolic monomer into the carbonate polymer backbone, then heat activating the crosslinking reaction. In U.S. Pat. No. 3,770,697 and U.S. Pat. No. 3,652,715 carbonate polymers are provided with thermally activated, terminal or pendant unsaturated imido groups which can be reacted. Branched resins, however, have been found to have somewhat lower impact resistance values than a corresponding linear resin of the same melt flow rate.

It is therefore a goal of the present invention to provide an improved easy flow carbonate polymer resin, an improved process for the preparation of injection molded, thin-walled corner parts and improved injection molded, thin-walled corner parts themselves.

SUMMARY OF THE INVENTION

Therefore, in one aspect the invention is a carbonate polymer blend composition comprising a first higher molecular weight branched carbonate polymer component and a second, carbonate polymer component having a lower molecular weight than the first component, characterized in that the first higher molecular weight branched carbonate polymer component has a weight average molecular weight of at least about 1.3, preferably 1.5 times that of the second linear carbonate polymer component and the blend composition has a weight average molecular weight of from about 20,000 to about 29,000, preferably from about 22,000 to about 24,000.

In another aspect, the invention is a process for preparing an injection molded, thin-walled corner part comprising the step of injection molding a thin-walled corner part from carbonate polymer blend compositions of this type. In one embodiment, the first carbonate polymer component is prepared from a precursor component having one or more latently reactive moieties capable of forming a higher molecular weight branched carbonate polymer upon heat activation.

A particular process for preparing an injection molded, thin-walled corner part comprises the steps of: (a) supplying to an injection molding means equipped with a mold for forming a thin-walled corner part a carbonate polymer blend composition comprising (i) a first carbonate polymer precursor component having latently reactive moieties capable of forming a higher molecular weight branched carbonate polymer component upon heat activation and (ii) a second, different carbonate polymer component having a lower molecular weight than the higher molecular weight branched carbonate polymer formed by the first component (i), (b) processing and molding the carbonate polymer blend composition in the injection molding means under conditions sufficient to heat activate the latently reactive moieties of the first carbonate polymer precursor component and thereby forming a higher molecular weight branched carbonate polymer component during the injection molding process, and (c) producing an injection molded, thin-walled corner part having improved cracking resistance.

The invention also involves an injection molded, thin-walled corner part molded from a carbonate polymer blend composition comprising a first higher molecular weight branched carbonate polymer component and a second, different carbonate polymer component having a lower molecular weight than the first component. In a preferred embodiment of this aspect, the molded part has distinct sides extending from a corner point in at least 2 directions preferably at least 3 directions. Preferably the thin-walled corner part has a thickness dimension of less than about 0.5 centimeters throughout at least about 5% of its surface area.

As will be described in more detail below, the easy flow molding resin, injection molding process and injection molded parts according to the present invention provide surprisingly improved combinations of processability and physical properties in the molded part. As will also be described in more detail below, the injection molding process and molded parts are obtained using a particular, easy flow carbonate polymer blend composition comprising a first higher molecular weight branched carbonate polymer component and a second, different carbonate polymer component having a lower molecular weight than the first component.

In a particularly advantageous aspect of the present invention, the carbonate polymer blend is prepared by using a component which is a precursor of the first higher molecular weight branched carbonate polymer component. The precursor component comprises a latently reactive moiety that creates the high molecular weight branched carbonate polymer component upon sufficient thermal activation. The precursor component is intimately mixed with and dispersed throughout the second carbonate polymer component prior to or in conjunction with thermal activation of a latently reactive moiety that creates a high molecular weight branched carbonate polymer component in situ. In this way, carbonate polymer components of similar initial molecular weights can be more readily blended prior to the creation of the high molecular weight branched component resulting in a better, more homogeneous mixture of the high molecular weight branched carbonate polymer component with the other carbonate polymer component.

DETAILED DESCRIPTION

Figure 1:
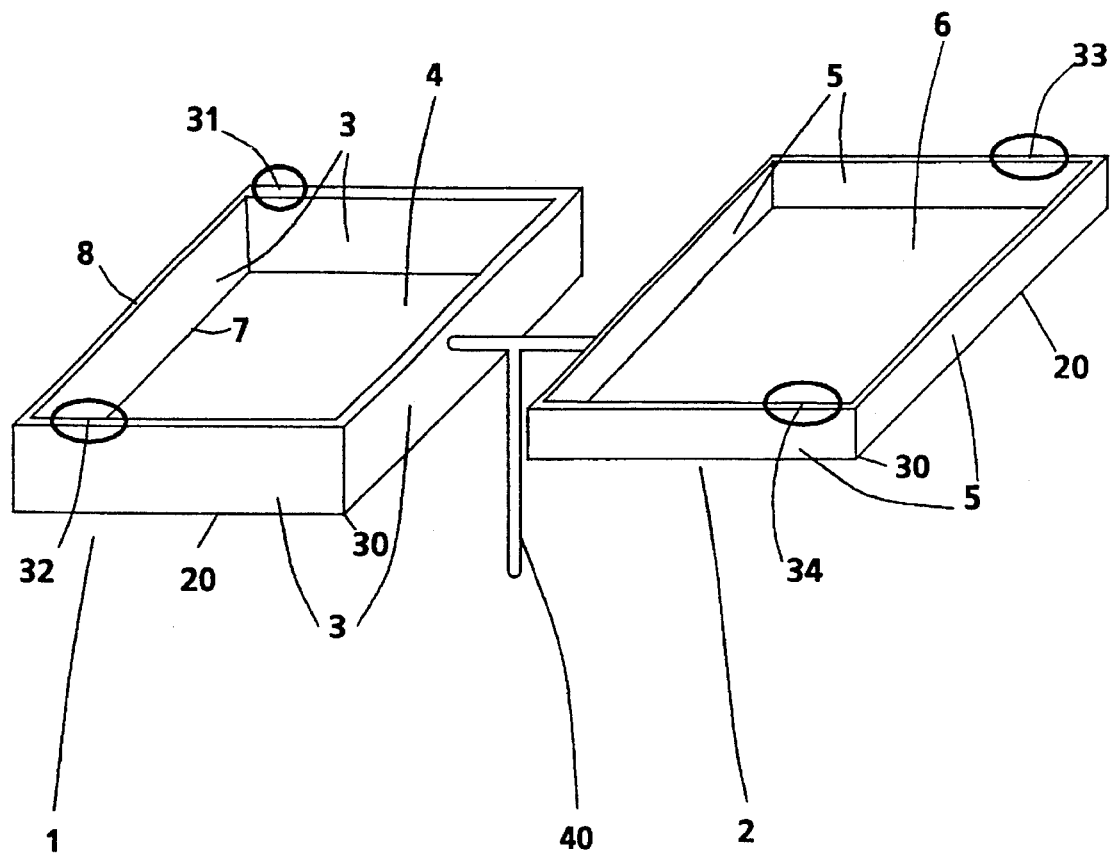
FIG. 1 is a perspective view of an injection molded, thin-walled corner part, the part being a card box 1, top 2 and sprue 40.

The higher molecular weight branched carbonate polymers suitable for use in the first component in the compositions according to the present invention can be prepared by techniques known in the literature. Unless otherwise indicated, the references to "molecular weight" herein refer to weight average molecular weights ("Mw") determined on the carbonate polymers using gel permeation chromatography with a bisphenol A polycarbonate standard. Otherwise, viscometry or light scattering can also be used to determine weight average molecular weight. It should be noted that various references refer to "viscosity average" molecular weight, which is not the same as weight average molecular weight but can be correlated or converted to Mw values.

In general, these carbonate polymers are prepared from one or more multihydric components by reacting the multihydric compound, such as a diphenol, with a carbonate precursor such as phosgene, a haloformate or a carbonate ester such as diphenyl or dimethyl carbonate. Aromatic carbonate polymers are preferred and aromatic diphenols are preferred for use as at least part of the multihydric compound with preferred diphenols including but not limited to 2,2-bis (4-hydroxyphenyl)-propane (i.e., bisphenol A), phenol, 4,4'-(9-H-fluorene-9-ylidene)bis (i.e., bishydroxyphenylfluorene), 4,4'-thiodiphenol (TDP), 1,1-bis (4-hydroxyphenyl)-1-phenyl ethane (bisphenol AP); phenolphthalein; bis (4-hydroxyphenyl) diphenyl methane; tetrabromobisphenol A (TBBA); and tetrachlorobisphenol A (TCBA). These carbonate polymers also include aromatic carbonate polymers prepared from two or more different dihydric phenols or a combination of a dihydric phenol and a glycol or a hydroxy- or acid-terminated polyester or a dicarboxylic acid in the event a carbonate copolymer or heteropolymer is desired.

The higher molecular weight branched carbonate polymer conponents can be prepared from such materials by any of several known processes such as the known interfacial, solution or melt processes. Suitable types and amounts of chain terminators (typically monophenolic compounds) and/ or branching agents (typically phenols having three or more hydroxy groups) can be employed to obtain the desired molecular weight and branching degrees in the higher molecular weight branched component.

It has been found very advantageous to prepare a suitable higher molecular weight, branched carbonate polymer component by preparing a precursor component, preferably a precursor carbonate polymer component, which has a latently reactive moiety. If the precursor is a polymer, the latently reactive moiety can be directly incorporated into the precursor polymer using a suitable monomer or attached to the polymer in a later functionalization step. Preferably the precursor component latently reactive moieties form products having an average functionality greater than two, meaning that they are able to form at least one branch from a polymer backbone. Such latently reactive moieties preferably can be rapidly activated, preferably thermally, and preferably without the use of additional reactive compounds at a desired time and produce a desired higher molecular weight, branched carbonate polymer component without producing undesired, low molecular weight by-products or undesirably large domains of highly crosslinked polymer gels. Most preferably, such moiety can be incorporated into the carbonate polymer in an interfacial carbonate polymer polymerization process.

As used herein, the term "interfacial carbonate polymer polymerization process" refers to a process where the multihydric reactants, including any multi- or mono-reactive compounds used to incorporate the latently reactive moiety, are dissolved in a water phase by forming an alkali metal adduct, then reacted with the carbonate polymer precursor forming a polymer which is dissolved in a separate organic phase. For example, dihydric phenols are dissolved as alkali metal phenates for reaction with the carbonate precursor forming an aromatic carbonate polymer which is dissolved in a separate organic phase. As those skilled in this area know, nitrogen-containing moieties, such as the unsaturated imido compounds of U.S. Pat. Nos. 3,652,715 and 3,770, 697, cannot generally be present or incorporated in such a process and are therefore not suitable for use in aspect of the present invention.

According to a preferred aspect of the present invention, an intermediate composition is formed where the carbonate polymer blend composition comprises a first carbonate polymer precursor component having latently reactive moieties and a second carbonate polymer having a lower molecular weight than the higher molecular weight component that is formed by the first precursor component. Then, a higher molecular weight, branched carbonate polymer is prepared without the use of added radical initiating compounds, or the like, merely by activation of the latently reactive moieties, preferably thermally.

As mentioned, in a preferred embodiment of the present invention, the latently reactive moieties are activated at temperatures and other conditions below which the carbonate polymer is degraded. The degradation conditions for a particular carbonate polymer, of course, depend somewhat on the exact composition of the carbonate polymer, including the particular multi-hydroxy compound(s) upon which it is based. For example, in the case of polycarbonates based on phosgene and bisphenol A, it has been found that unacceptable degradation begins to occur at temperatures on the order of about 400° C.

A preferred technique to provide a latent, thermally reactive moiety is to utilize arylcyclobutene terminated carbonate polymers such as are shown in U.S. Pat. Nos. 5,198,527 and 5,171,824. It has been found that the arylcyclobutene terminated carbonate polymers are readily processable at standard carbonate polymer processing conditions, can be very readily combined with and thoroughly dispersed in a second carbonate polymer component across a range of molecular weights in the second component. As shown, the arylcyclobutene moieties can then be heat activated to combine via the arylcyclobutene moieties to produce the high molecular weight, branched polymer component. These are especially preferred high molecular weight carbonate polymer components since the arylcyclobutene reaction does not require any free radical initiator or other activating compounds to initiate the addition reaction at reasonable temperatures and conditions for processing Bisphenol A-based polycarbonate.

Moreover, the arylcyclobutene reaction is exceptionally clean in that it does not simultaneously produce any low molecular weight byproduct materials as are typically resulting from many of the carbonate polymer crosslinking reactions. The arylcyclobutene combination reaction is relatively quick and sufficiently selective to produce a high molecular weight, branched carbonate polymer during an extrusion or molding process employing the precursor resin. In addition, it should be noted that substitution of the aryl ring of the arylcyclobutene compounds can be used to increase or decrease the reactivity of the cyclobutene group.

In terms of the arylcylcobutene terminated carbonate polymers suited for use as the high molecular weight branched carbonate polymer component, it has been found desirable to incorporate the arylcyclobutene in amounts of at least about 0.01, preferably at least about 0.02, and most preferably at least about 0.03 mole arylcyclobutene moieties per mole diphenol monomer in the carbonate polymer to obtain suitable high molecular weight branched carbonate polymer components. Preferred arylcylcobutene terminated carbonate polymers suited for use as the high molecular weight branched carbonate polymer component would contain arylcyclobutene in amounts below that at which insoluble polymer gels are formed, desirably less than about 0.5, preferably less than about 0.4 and more preferably less than about 0.3, and most preferably less than about 0.2 mole arylcyclobutene moieties per mole diphenol monomer in the carbonate polymer.

Other latent, thermally reactive moieties suitable for use in preparing high molecular weight branched carbonate polymer components include, for example cyanate, biphenylene, vinyl, propargyl, acrylic, methacrylic and allyl.

In general, by whatever production technique it is prepared, the higher molecular weight, branched carbonate polymer component should have a weight average molecular weight of at least about 1.3 times that of the second carbonate polymer, preferably at least about 1.5 times and more preferably at least about 1.7 times. In order to obtain polymer blends with minimized levels of gels and other beneficial effects of the high molecular weight branched component, it has been found that the weight average molecular weight of the high molecular weight branched component should not be higher than about 35 times that of the second carbonate polymer, preferably not higher than about 20 times, more preferably not higher than about 7 times, most preferably not higher than about 5 times.

When using as the second lower molecular weight carbonate polymer component, a linear carbonate polymer based on bisphenol A and having a weight average molecular weight in the range of 10,000 to 24,000, it can therefore be seen that the molecular weight of the high molecular weight branched component should be at least about 30,000, preferably at least about 31,000, more preferably at least about 32,000. When a precursor component with latently reactive branching moieties is employed to provide the high molecular weight branched carbonate polymer component, the precursor component can often be more readily mixed into the second component having a molecular weight higher, lower or generally the same as the precursor component. When this precursor technique is used to provide the high molecular weight, branched component, the molecular weight of the high molecular weight, branched component is generally less than about 600,000, preferably less than about 300,000. In cases where the higher molecular weight branched carbonate polymer component is prepared in a conventional process and subsequently combined in the form of higher molecular weight branched carbonate polymer into to the easy flow resin according to the present invention, the molecular weight is preferably less than about 100,000, more preferably less than about 70,000, more preferably less than about 55,000 and most preferably less than about 40,000.

As is known, the branched carbonate polymers produced from precursor components or in other branched carbonate polymer preparation processes will have branches on only a portion of the molecules. For example, commercial "branched" polycarbonates are believed to have branch sites on about 15 percent of the molecules, with the balance of molecules being "unbranched" or linear. As used herein, the term "branched carbonate polymer component" refers to the entire reaaction product of a branched carbonate polymer preparation process, in spite of and including the presence of amounts of unbranched carbonate polymer molecules.

It has been observed that the desired properties in the final blend composition are a function of the level of branching in the high molecular weight, branched component and the amount of high molecular weight, branched component to be used. Therefore, the level of branching in the high molecular weight, branched component as well as the amount of high molecular weight, branched component can vary, with higher levels of branching requiring less of the component and vice versa.

In general, the degree of branching can be determined in the high molecular weight branched carbonate polymer component by measuring the concentration of reacted branching agent in an amount of the high molecular weight branched carbonate polymer prior to incorporation in the blend or in an amount of the high molecular weight branched carbonate polymer component that has been isolated from the carbonate polymer blend compositions. The concentration of reacted branching agent in the high molecular weight branched carbonate polymer component can typically be determined by IR or NMR spectroscopy or by liquid chromatography, depending upon the nature of the branching agent. It has been found that levels of branching agent in the higher molecular weight branched carbonate polymer components for use in the present invention should be in the range of from about 0.0005 to about 0.1 mole branching agent per mole of dihydroxy compound, preferably from about 0.001 to about 0.05, and more preferably from about 0.002 to about 0.03.

It is sometimes difficult, however, to directly measure the degree of branching in the branched, high molecular weight component, especially when this component has been prepared in situ by activation of a latently reactive moiety. In general, however, it can be indirectly determined whether there is a sufficient degree of branching in the high molecular weight branched carbonate polymer by measuring the change in shear sensitivity due to the incorporation of the high molecular weight branched carbonate polymer in a carbonate polymer blend composition. It has been found that the high molecular weight branched component should have a degree of branching sufficient to provide an improvement or increase in the shear sensitivity of the resulting blend. In other words, the HMWB PC is sufficiently branched if it provides "shear thinning" in the final blend composition.

This means that if the viscosities of the blend composition and the lower molecular weight carbonate polymer component alone are independently measured at increasing levels of shear, the measured viscosity of the claimed blend composition is observed to be reduced to a greater degree or at a greater rate than observed for the lower molecular weight carbonate polymer component without the high molecular weight branched component. It has been found that higher molecular weight branched components with higher degrees of branching will provide shear sensitivity improvements at lower levels while lower degrees of branching will conversely require use of the component in larger amounts to provide shear sensitivity improvements. These measurements of shear sensitivity can be done by standard techniques with dynamic mechanical spectroscopy (DMS) or by capillary rheometry.

In particular, a fairly standard measurement technique for shear sensitivity of carbonate polymers involves measuring the complex viscosity of a polymer ($\eta$) under two different shear levels, 0.3 radians per second (lower shear) and 10 radians per second (higher shear) by dynamic mechanical spectroscopy at 280° C. Then, the ratio of those two numbers is determined, $\eta/\eta(0.3/10)$. The value of the $\eta/\eta$ ratio for the linear polycarbonate control sample is taken as a baseline value of 1. Values of the $\eta/\eta$ ratio greater than 1.3, preferably greater than or equal to 1.5, more preferably greater than or equal to 2, show that there is an "improvement" or "increase" in shear sensitivity as that term is used herein.

As mentioned above, the level of branching in the higher molecular weight branched component determines the level of high molecular weight branched component in the carbonate polymers. In general, it has been found suitable to employ the high molecular weight, branched component in the carbonate polymers in amounts of at least about 1 weight percent, desirably at least about 5 weight percent, preferably at least about 7 weight percent and more preferably at least about 10 weight percent, said weight percentages being based upon total amount of the two carbonate polymer components. In order to maintain processability and thermal plasticity, the high molecular weight, branched component is employed in amounts less than or equal to about 30 weight percent, preferably less than or equal to about 25 weight percent, and more preferably less than or equal to about 20 weight percent.

When using arylcyclobutene terminated carbonate polymers as the high molecular weight branched carbonate polymer precursor component, it has been found desirable to incorporate the arylcyclobutene-containing polymer in amounts sufficient to provide increased shear sensitivity in the resulting polymer. It is generally desired to employ such polymer in amounts of at least about 1, preferably at least about 3, more preferably at least about 5 and most preferably at least about 7 weight percent by weight arylcyclobutene-containing carbonate polymer in the preparation of composition according to the present invention. In general it has been found that the advantageous property combinations can be obtained using arylcylcobutene terminated carbonate polymers in amounts up to and including about 30, preferably up to and including about 25, more preferably up to and including about 20, and most preferably up to and including about 15 percent by weight based on the first and second carbonate polymer component.

The carbonate polymers suitable for use as the second, lower molecular weight carbonate polymer component are known in the literature and commercially available. In general, these are carbonate polymers having a relatively low weight average molecular weight (high melt flow rate) compared to standard, injection molding carbonate polymer resins. Suitable lower molecular weight carbonate polymer components are sometimes known and commercially available as "easy flow" or "compact disk" grades. For the best balances of processability and physical properties, it is preferred to employ a linear, lower molecular weight carbonate polymer component.

It is understood that the second, lower molecular weight components suitable for use according to the present invention may be a single component carbonate polymer directly obtained from a polymerization process. On the other hand, the second, lower molecular weight component can also be based on a combination of two different components of differing molecular weights and melt flow rates that are blended to obtain the desired intermediate melt flow rate product. This type of system is practiced commercially to provide a broader range of polycarbonate resins of differing melt flow rates while reducing the overall number of different products that the production facility must supply.

For purposes of obtaining desired resistance to cracking in the molded corner parts, it has been found that the second, lower molecular weight carbonate polymer component should have a weight average molecular weight of at least about 10,000, preferably at least about 13,000, more preferably at least about 16,000, and most preferably at least about 17,000. In order to keep the desired level of polymer melt flow and processability it has been found that the second, lower molecular weight carbonate polymer component should have a weight average molecular weight of no more than about 22,000, preferably no more than about 20,000, more preferably no more than about 19,000, most preferably no more than about 18,000.

As known, these carbonate polymers are prepared from the dihydric components and by processes as listed above for the higher molecular weight branched carbonate polymers. As is also well known, suitable chain terminators (typically monophenolic compounds) can be employed to obtain the desired molecular weight in the lower molecular weight component.

The carbonate polymers suitable for use as the first, higher molecular weight branched and second, lower molecular weight carbonate polymer component in the present invention also include carbonate polymers prepared from two or more different multihydroxy compounds, preferably dihydroxy compounds, and preferably phenols, or a combination of a multihydroxy compound, such as a diphenol, and a glycol or a hydroxy- or acid-terminated polyester or a dicarboxylic acid in the event a carbonate copolymer or heteropolymer is desired. It is also possible to employ multifunctional carboxylic acids, especially aromatic carboxylic acids, and prepare poly(ester-carbonate) resins such as the known aromatic poly(ester-carbonates) The known silicon-containing carbonate monomers can also be used to prepare silicon-containing carbonate polymers that are suitable for use in the blends according to the present invention.

Also suitable for use as the first, higher molecular weight branched and second, lower molecular weight carbonate polymer components for practice of the invention are blends of two or more of the above-described carbonate polymer components.

One of the key features of the resin blend compositions according to the present invention and suitable for use in the processes and articles according to the present invention is that the blend compositions have a weight average molecular weight within the desired range. For purposes of obtaining desired resistance to cracking in the molded corner parts, it has been found that the blends should have a weight average molecular weight of at least about 18,000, preferably at least about 20,000, more preferably at least about 21,000 and most preferably at least about 22,000. In order to keep the desired level of polymer melt flow and processability it has been found that the blends should have a weight average molecular weight of no more than about 29,000, preferably no more than about 26,000, more preferably no more than about 25,000, most preferably no more than about 24,000. In this range it has been found that the resin blend compositions should have a melt flow rate of at least about 9, preferably at least about 16, more preferably at least about 19 and most preferably at least about 22.

It has been found that the process for preparing injection molded, thin-walled corner parts and the resulting parts according to the present invention are surprisingly improved by use of the described carbonate polymer blend compositions. As used herein, the term "thin-walled part" means a part having a thickness dimension of less than about 0.5 centimeters throughout at least about 5% of its surface area(s), more particularly to parts having such a thickness dimension of less than about 0.4 centimeters and even more particularly to parts having such a thickness dimension of less than about 0.3175 centimeters (⅛ inch).

The term "corner part" means a part having walls or sides extending in at least two, preferably three different planes or dimensions. For example, injection molded thin-walled corner parts, such as computer housings or enclosures, prepared according to the invention have reduced tendency to crack from molded-in stress. FIG. 1 shows a corner part having distinct sides extending 2 different directions represented by the regions identified as 20, and having distinct sides extending in 3 different directions as represented by the regions identified as 30. As used herein, the term "corner part" does not mean a flat or one dimensional part, such as a square or rectangular plaque, regardless of the shape or geometry.

Injection molding processes are well known in the art and commercially practiced for production of a broad range of molded parts. As is known, injection molding processes typically include the steps of plasticating the resin under shearing and/or heating to provide a flowable resin, injection of the heat plastified flowable resin into the mold through a runner, applying additional pressure to pack the resin into the mold and cooling the molded parts to solidify the part enough to remove it from the mold. During the injection step, the easier the material processes, the less energy is required to inject the material into the mold and the less pressure needs to be applied to the material to fill the mold.

The improvements in resins and the injection molding process according to the present invention are due to the lower viscosity of the material at the processing conditions combined with the improved crack resistance properties that are obtained in the molded part. The apparent shear rate which the material experiences during the filling step is predominantly governed by the geometry of the part and the injection speed. This apparent shear rate is constant for a constant wall thickness part such as a compact disk but changes unpredictably where the part has a corner and/or a variable thickness. Therefore, for filling a part that has a corner and/or a variable thickness, improving high shear rate viscosity becomes critically important in order to avoid high residual tensile streses imparted in these types of areas during the injection and cooling steps of the injection molding process. Otherwise, stress cracking is typically a problem where high residual tensile streses are imparted.

In addition to the higher and lower molecular weight components, the carbonate polymer compositions according to the present invention can advantageously contain the standard types and amounts of the additive-type components frequently incorporated into carbonate polymers. These components can include ignition resistance additives, fillers (i.e., glass fibers, talc, clay, etc.), pigments, dyes, antioxidants, heat stabilizers, ultraviolet light absorbers, mold release agents, impact modifiers, antistatic additives, and the other additives commonly employed in carbonate polymer compositions.

The following Experiments are given to further illustrate the invention and should not be construed as limiting its scope. In the following Experiments, all parts and percentages are by weight unless otherwise indicated.

Experiments—Injection Molding Thin Walled Parts

Several experiments were performed showing the benefits of a higher molecular weight branched carbonate polymer resin (hereinafter "HMWB PC") in improving crack resistance in 17,700 Mw (easy flow) polycarbonate in thin walled corner part applications. The materials used in these experiments are shown in Table I. Except for the benzocyclobutene-terminated polycarbonate ("BCB PC") precursor component for the HMWB PC, these are known, commercially available polycarbonate resins.

The benzocyclobutene-terminated polycarbonate ("BCB PC") precursor component for the HMWB PC was prepared generally according to the technique disclosed in U.S. Pat. Nos. 5,198,527 and 5,171,824. The BCB PC precursor was determined to contain 0.06 moles benzocyclobutene per mole bisphenol A and have a degree of polymerization of about 27. The weight average molecular weight of the BCB PC before any branching was determined to be 18,190 by gel permeation chromatographic analysis. The molecular weights of the other components were determined by gel permeation chromatography (GPC). The melt flow rate (MFR) values are measured according to ASTM D-1238, conditions of 300° C. and 1.2 kilograms mass and are reported in grams per 10 minutes (gr/10 min). The melt flow rate values for the BCB PC before and after branching are not measurable since a non-flowing, crosslinked gel is formed when heating the BCB PC component in the absence of the lower molecular weight component.

TABLE I

| No. | Polycarbonates Type | Mw | MFR |
|---|---|---|---|
| a | Linear | 17,700 | >80 |
| b | Linear | 37,300 | 3.5 |
| c | Branched | 32,600 | 3 |
| d | Branched | | |
| | BCB PC before branching | 18,190 | NA |

TABLE I-continued

| | Polycarbonates | | |
|---|---|---|---|
| No. | Type | Mw | MFR |
| | BCB PC after branching | 300,000 | NA |

The blend compositions are shown in Table II below and were prepared by blending the indicated polycarbonate components. The BCB PC component, in flake form, was densified to pellets using a 1.5 inch (38.1 mm) Killion single-screw extruder. The pelletized components were then combined and compounded on a Werner and Pfleider 30 mm twin-screw extruder and re-pelletized using the barrel temperatures indicated in Table I. These pellets were then dried at 120° C. for at least 4 hours and molded into thin-walled parts. The HMWB PC component precursor based on the BCB PC used in these experimental compositions was observed to have blended homogeneously with the second component. Also, in the final products, the HMWB PC components were observed to have blended homogeneously with the second component and remained completely miscible with the second component. The blend compositions according to the invention are thermally stable (maintain molecular weight and color) at a temperature 100° C. above the Tg of the carbonate polymer blend composition, which was about 250° to 310° C. in this case.

TABLE II

Crack Resistant Easy Flow Formulations

| | Experiment No. | | | | | |
|---|---|---|---|---|---|---|
| Component | 1* | 2* | 3 | 4 | 5 | 6 |
| 80 MFR PC (wt %) | 100 | 85 | 93 | 96 | 90 | 75 |
| 3.5 MFR PC (wt %) | 0 | 15 | 0 | 0 | 0 | 15 |
| Branched PC (wt %) | 0 | 0 | 0 | 0 | 10 | 10 |
| 0.06 m/m BCB PC (wt %) | 0 | 0 | 7 | 4 | 0 | 0 |
| barrel temps (°C.) | N/A | 250–310 | 250–310 | 250–310 | 200–240 | 250–310 |
| Blend MFR | >80 | 40 | 41 | 50 | >80 | 30 |
| Mn | 8,500 | 8,600 | 8,300 | 8,100 | 8,600 | 9,200 |
| Mw | 17,700 | 19,000 | 21,400 | 19,300 | 19,000 | 21,800 |
| Mz | 32,800 | 33,800 | 49,400 | 32,800 | 33,800 | 42,700 |
| Poly-disperity | 2.09 | 2.2 | 2.57 | 2.4 | 2.2 | 2.25 |

| | Experiment No. | | | |
|---|---|---|---|---|
| Component | 7 | 8 | 9 | 10 |
| 80 MFR PC (wt %) | 95 | 85 | 70 | 65 |
| 3.5 MFR PC (wt %) | 0 | 0 | 20 | 15 |
| Branched PC (wt %) | 5 | 15 | 10 | 20 |
| 0.06 m/m BCB PC (wt %) | 0 | 0 | 0 | 0 |
| barrel temps (°C.) | 200–240 | 200–240 | 200–240 | 200–240 |
| Blend MFR | >80 | 53 | 24 | 23 |
| Mn | 8,500 | 8,800 | 9,400 | 9,400 |
| Mw | 18,600 | 19,700 | 22,600 | 23,300 |
| Mz | 40,500 | 36,200 | 40,100 | 52,000 |
| Poly-disperity | 2.18 | 2.25 | 2.4 | 2.48 |

Fabrication was performed using an 83 ton Arburg injection molding machine. The molded part is a two part card box, as shown in FIG. 1, having a box piece 1, a cover piece 2 and a sprue 40 (which was removed for use of the box). The box had a bottom wall 4 and side walls 3 that tapered slightly from the wall edge 7 where they met the bottom wall to the top wall edge 8. The cover 2 had side walls 5 and a top wall 6. Both the box and the cover have two and three dimensional corner areas, examples of the two dimensional corner areas shown by reference numeral 20 and examples of the three dimensional corner areas shown by reference numeral 30. The constant inner dimension of the box is 9.05 cm long by 5.75 cm wide by 1.85 cm deep. The side wall thickness of the box at the bottom edge 7 is 0.36 cm and at the top edge 8 where the cover fits in is 0.17 cm. The bottom wall of the box 4 had a thickness of 0.22 cm. The constant outer dimension of the cover is 9.4 cm long by 6.08 cm wide by 0.78 cm deep. The side walls of the cover 5 had a slightly thicker lip portion 9 where the thickness was about 0.21 cm and thinned slightly to a thickness of about 0.12 cm at the bottom 10 where the side wall meets the the bottom wall of the cover. The bottom wall 6 had a thickness of about 0.24 cm. The box was molded with a single submarine type end gate with a 1.31 mm by 3.3 mm rectangular cross-section for each piece. Molding conditions were the same for all card boxes, nozzle temperature set at 271° C. and mold temperature set at 82° C.

These molded boxes were then placed under ambient conditions for observation of crack developments. It was found that if the boxes cracked, they typically cracked in the areas shown by reference numbers 31, 32, 33 and 34 in FIG. 1. In these areas the resin had flowed a considerable distance through the mold and around several corners. In these locations there were high residual tensile stresses imparted during injection and cooling steps of the injection molding process. The times required and numbers of cracks on the molded boxes were observed as indicated below. Where there were no observed cracks during at least the initial three month measurement time, the "Time to First Crack" is not available ("N/A").

TABLE III

Cracking Results of Molded Card Boxes

| | 1* | 2* | 3 | 4 | 5 | 8 |
|---|---|---|---|---|---|---|
| Time to first Crack, days | 8 | 8 | 29 | 8 | 33 | 68 |
| % Boxes cracked at above period | 100 | 6 | 12.5 | 31 | 5 | 5 |
| Average # of cracks per box after 1 month | 3.5 | 0.18 | 0.06 | 1.23 | 0 | 0 |
| Average # of cracks per box after 3 months | 4.6 | 0.24 | 0.25 | 2.5 | 0.2 | N/A |

| | 7 | 6 | 9 | 10 |
|---|---|---|---|---|
| Time to first Crack, days | 8 | N/A | N/A | N/A |
| % Boxes cracked at above period | 5 | 0 | 0 | 0 |
| Average # of cracks per box after 1 month | 0.29 | 0 | 0 | 0 |
| Average # of cracks per box after 3 months | 0.71 | 0 | 0 | 0 |

What is claimed is:
1. A carbonate polymer blend composition comprising a first higher molecular weight branched carbonate polymer component and a second, carbonate polymer component having a lower molecular weight than the first component, characterized in that the second, lower molecular weight carbonate polymer component has a weight average molecular weight in the range of from about 16,000 to about 22,000 and the first higher molecular weight branched carbonate polymer component has a weight average molecular weight of at least about 1.3 times that of the second carbonate polymer component and less than about 100,000 and the blend composition is an injection molding resin with a weight average molecular weight of from about 20,000 to about 29,000.

2. A carbonate polymer blend composition according to claim 1 wherein the first higher molecular weight branched carbonate polymer component has a weight average molecular weight of at least about 1.5 times that of the second carbonate polymer component.

3. A carbonate polymer blend composition according to claim 1 wherein blend composition has a weight average molecular weight of from about 22,000 to about 24,000.

4. A carbonate polymer blend composition according to claim 1 wherein the second carbonate polymer component is a linear carbonate polymer.

5. A process for preparing an injection molded, thin-walled part having at least one corner with distinct sides extending from the corner point in at least two directions and having a thickness dimension of less than about 0.5 centimeters throughout at least about 5 percent of its surface area, the process comprising the step of injection molding a thin-walled corner part from a carbonate polymer blend composition having a weight average molecular weight of from about 20,000 to about 29,000 comprising a first higher molecular weight branched carbonate polymer component having a weight average molecular weight of at least about 1.3 times that of the second carbonate polymer component and less than about 100,000 and a second, different carbonate polymer component having a weight average molecular weight in the range of from about 16,000 to to 22,000.

6. A process according to claim 5 wherein the thin-walled corner part has distinct sides extending from the corner point in at least 3 directions.

7. A process according to claim 5 wherein the thin-walled corner part has a thickness dimension of less than about 0.3175 centimeters (⅛ inch) throughout at least about 5% of its surface area.

8. A process according to claim 5 wherein the first carbonate polymer component is prepared from a precursor component having one or more latently reactive moieties capable of forming a higher molecular weight branched carbonate polymer upon heat activation.

9. A process according to claim 5 wherein the carbonate polymer blend composition comprises from about 1 to about 30 weight percent first carbonate polymer component based on weight of first and second components.

10. A process according to claim 5 wherein the carbonate polymer blend composition comprises from about 10 to about 20 weight percent first carbonate polymer component based on weight of first and second components.

11. A process for preparing an injection molded, thin-walled part having at least one corner with distinct sides extending from the corner point in at least two directions and having a thickness dimension of less than about 0.5 centimeters throughout at least about 5 percent of its surface area, the process comprising the steps of:

(a) supplying to an injection molding means equipped with a mold for forming a thin-walled corner part a carbonate polymer blend composition comprising (i) a first carbonate polymer precursor component having latently reactive moieties capable of forming a higher molecular weight branched carbonate polymer component upon heat activation and (ii) a second, different carbonate polymer component having a weight average molecular weight in the range of from about 16,000 to about 22,000 and lower than the higher molecular weight branched carbonate polymer formed by the first component (i), (b) processing and molding the carbonate polymer blend composition in the injection molding means under conditions sufficient to heat activate the latently reactive moieties of the first carbonate polymer precursor component and thereby forming a higher molecular weight branched carbonate polymer component during the injection molding process, and (c) producing an injection molded, thin-walled corner part having improved cracking resistance consisting of a blend composition having a weight average molecular weight of from about 20,000 to about 29,000 comprising a higher molecular weight branched carbonate polymer component having a weight average molecular weight of at least about 1.3 times that of the second carbonate polymer component and less than about 100,000.

12. A process according to claim 11 wherein the first carbonate polymer precursor component comprises terminally located, latently reactive arylcyclobutene moieties.

13. An injection molded, thin-walled part having at least one corner with distinct sides extending from the corner point in at least two directions and having a thickness dimension of less than about 0.5 centimeters throughout at least about 5 percent of its surface area, characterized in that the part is molded from a carbonate polymer blend composition having a weight average molecular weight of from about 20,000 to about 29,000 comprising a first higher molecular weight branched carbonate polymer component having a weight average molecular weight of at least about 1.3 times that of the second carbonate polymer component and less than about 100,000 and a second, different carbonate polymer component having a weight average molecular weight in the range of from about 16,000 to about 22,000 and lower than the first component.

14. A molded part according to claim 13 having distinct sides extending from the corner point in at least 3 directions.

15. A molded part according to claim 13 having a thickness dimension of less than about 0.3175 centimeters (⅛ inch) throughout at least about 5% of its surface area.

16. A molded part according to claim 13 wherein the first carbonate polymer component is prepared from a precursor component having one or more latently reactive moieties capable of forming a higher molecular weight branched carbonate polymer component upon heat activation.

* * * * *

UNITED STATES PATENT AND TRADEMARK OFFICE
CERTIFICATE OF CORRECTION

PATENT NO : 5,508,359

DATED : Apr. 16, 1996

INVENTOR(S) : Hoang T. Pham

It is certified that error appears in the above-identified patent and that said Letters Patent is hereby corrected as shown below:

Claim 4, Column 13, line 37, "from about 16,000 to to 22,000." should correctly read --from about 16,000 to about 22,000.--.

Signed and Sealed this

Twenty-third Day of November, 1999

Attest:

Q. TODD DICKINSON

Attesting Officer     Acting Commissioner of Patents and Trademarks